United States Patent
Cho et al.

(10) Patent No.: US 7,991,530 B2
(45) Date of Patent: Aug. 2, 2011

(54) SYSTEM AND METHOD FOR CLASSIFYING VEHICLE OCCUPANT

(75) Inventors: Young Nam Cho, Suwon-si (KR); Yong Sun Kim, Namyangju-si (KR)

(73) Assignee: Kia Motors Corp., Seoul (KR)

( * ) Notice: Subject to any disclaimer, the term of this patent is extended or adjusted under 35 U.S.C. 154(b) by 836 days.

(21) Appl. No.: 11/972,342

(22) Filed: Jan. 10, 2008

(65) Prior Publication Data

US 2008/0312795 A1 Dec. 18, 2008

(30) Foreign Application Priority Data

Jun. 14, 2007 (KR) ........................ 10-2007-0058284

(51) Int. Cl.
*B60R 22/00* (2006.01)
*G01G 19/08* (2006.01)
*B60N 2/42* (2006.01)

(52) U.S. Cl. ............ 701/45; 701/49; 340/667; 180/273; 177/136; 297/217.2; 297/216.1; 73/865

(58) Field of Classification Search .................... 701/36, 701/45, 49; 340/665–667, 436, 438; 180/271, 180/273; 177/136, 144, 184; 280/727, 730.1, 280/730.2, 735; 296/68.1; 297/216.1, 216.11, 297/217.1, 217.2, 217.3; 73/1.13, 865
See application file for complete search history.

(56) References Cited

U.S. PATENT DOCUMENTS

| | | | | | |
|---|---|---|---|---|---|
| 5,984,350 | A | * | 11/1999 | Hagan et al. | 280/735 |
| 6,364,352 | B1 | * | 4/2002 | Norton | 280/735 |
| 6,467,804 | B2 | * | 10/2002 | Sakai et al. | 280/735 |
| 6,557,424 | B1 | * | 5/2003 | Morell | 73/862.045 |
| 6,771,175 | B1 | * | 8/2004 | Eagle et al. | 340/573.1 |
| 7,023,355 | B2 | * | 4/2006 | Sakai et al. | 340/667 |
| 7,455,343 | B2 | * | 11/2008 | Endo et al. | 296/68.1 |
| 7,478,699 | B2 | * | 1/2009 | Kobayashi et al. | 180/273 |
| 7,562,735 | B2 | * | 7/2009 | Kobayashi et al. | 180/273 |
| 7,584,037 | B2 | * | 9/2009 | Sakai et al. | 701/45 |
| 2003/0174579 | A1 | * | 9/2003 | Rioux | 367/37 |
| 2003/0201880 | A1 | * | 10/2003 | Lu | 340/443 |
| 2007/0061102 | A1 | * | 3/2007 | Kim | 702/173 |
| 2007/0086293 | A1 | * | 4/2007 | Kim | 369/47.53 |
| 2007/0118265 | A1 | * | 5/2007 | Im | 701/45 |

FOREIGN PATENT DOCUMENTS

| | | | |
|---|---|---|---|
| JP | 9-207638 A | * | 12/1997 |
| JP | 2003-291707 A | * | 10/2003 |
| KR | 10-2006-00031393 A | * | 7/2004 |
| KR | 10-2006-00700093 A | * | 12/2004 |

* cited by examiner

*Primary Examiner* — Thomas G Black
*Assistant Examiner* — Ce Li
(74) *Attorney, Agent, or Firm* — Morgan, Lewis & Bockius LLP

(57) ABSTRACT

A system and method for classifying a vehicle occupant is disclosed. A base is installed in each of leg frames of a seat of a vehicle. A cover is installed above the base to be spaced apart from the base. Two weight sensors are installed between the base and the cover to support the cover, and configured to measure a load transmitted to the cover by the weight of a vehicle occupant sitting in the seat. A control unit receives load values measured by the weight sensors, and determines whether the vehicle occupant sitting in the seat is an adult or a child based on the received load values. A shock absorption member is interposed between the weight sensors and the base. A stopper is interposed between the base and the cover in order to limit a downward movement range of the cover in a case of overload.

12 Claims, 6 Drawing Sheets

SYSTEM AND METHOD FOR CLASSIFYING VEHICLE OCCUPANT

CROSS-REFERENCE TO RELATED APPLICATIONS

This application claims priority to Korean Application No. 10-2007-0058284, filed on Jun. 14, 2007, the disclosure of which is incorporated herein by reference.

BACKGROUND OF THE INVENTION

1. Field of the Invention

The present invention relates to a system for classifying a vehicle occupant, and, more particularly, to a system for classifying a vehicle occupant which classifies a vehicle occupant sitting in the seat of a vehicle in order to deploy an airbag only for an occupant who has an age equal to or greater than certain age or certain physical requirements.

2. Description of the Related Art

Recently, in many cases, airbags are installed for passenger seats as well as a driver's seat.

Such airbags are deployed when a collision between vehicles occurs, and thus protecting vehicle occupants. In the case of an adult, there is no problem when using an airbag, but in the case of a small child, a deployed airbag may act as a dangerous factor that threatens its life thereof. Therefore, whether an airbag for a passenger seat should be deployed must be determined depending on the type of vehicle occupant.

With reference to FIG. 1, criteria for airbag deployment according to the Federal Motor Vehicle Safety Standards (FMVSS) 208 will be described. According to the FMVSS 208, in the case of adults, an airbag is to be deployed, but in the case of small children 6 years old or younger, an airbag must be prevented from being deployed. The reason for this is to protect small children 6 years old or younger using a separate Child Restraint System (CRS), rather than an airbag in the event of accidents.

In order to discriminate between adults and small children, as described above, a vehicle occupant classification system must be installed in the seat Some currently used vehicle occupant classification systems basically use the differences in weight between adults and small children. For example, as shown in FIG. 2, a conventional system for classifying a vehicle occupant is configured such that a control unit 4 identifies vehicle occupants using input values from four weight sensors S1 to S4 installed between the leg frames 2 and moving rails 3 of a seat 1, and the results of the sensing are transmitted to an Airbag Control Unit (ACU).

However, the above-described conventional system for classifying a vehicle occupant has problems in that the price thereof is relatively high because it requires four weight sensors, and that it is difficult to install in a seat and the burden of work increases because respective components of the system are individually installed in a seat.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art, and an object of the present invention is to provide a system for classifying a vehicle occupant which can accurately classify a vehicle occupant while reducing the number of weight sensors.

Another object of the present invention is to provide a system for classifying a vehicle occupant, which is modulized, so that the assembly and durability for seats are excellent.

In order to accomplish the above object, the present invention provides a system for classifying a vehicle occupant, including a base installed in each of leg frames of a seat of a vehicle; a cover installed above the base to be spaced apart from the base; two weight sensors installed between the base and the cover to support the cover, and configured to measure a load transmitted to the cover by the weight of a vehicle occupant sitting in the seat; and a control unit configured to receive load values measured by the weight sensors, and determine whether the vehicle occupant sitting in the seat is an adult or a child based on the received load values.

Preferably, a shock absorption member is interposed between the weight sensors and the base, and a stopper is interposed between the base and the cover in order to limit the downward movement range of the cover in the case of overload.

Meanwhile, a method of classifying a vehicle occupant sitting in a seat using a system for classifying a vehicle occupant using two weight sensors, the method including calculating the weight of a vehicle occupant by multiplying two-sensor measurement load value set by an optimal independent variable set, and comparing the calculated weight of the vehicle occupant with a preset threshold value, and determining whether the vehicle occupant is an adult or a child, where the optimal independent variable set is a variable set that, in experiments for various types of adult and child dummies, belongs to variable sets within a preset range, by which the two-sensor measurement load value set is multiplied, and maximizes the difference between the minimum weight value of the adult dummies and the maximum weight value of the child dummies;

Preferably, the optimal independent variable set $(X1_k, X2_k)$ have a relationship of $X1_k + X2_k = $ a predetermined rational value.

Further, preferably, each element $X1_k$ and $X2_k$ of the optimal independent variable set $(X1_k, X2_k)$ has a value ranging from 0 to 2.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
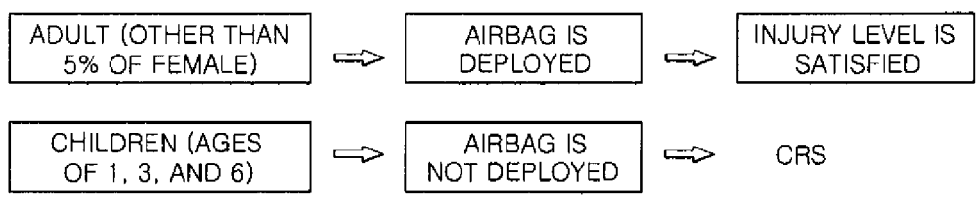
FIG. 1 is a diagram showing conventional criteria for airbag deployment.
Figure 2:
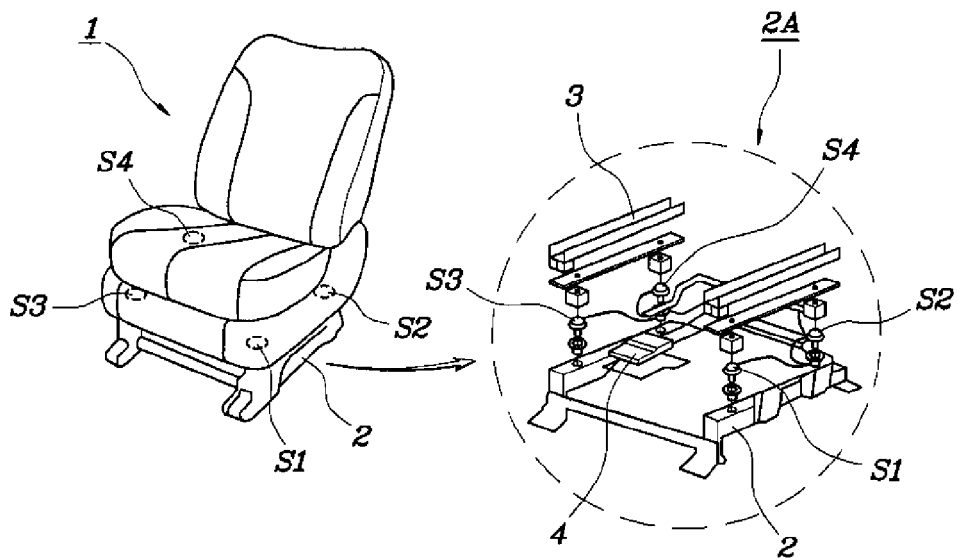
FIG. 2 is a schematic diagram showing a system for classifying a vehicle occupant having four sensors according to the prior art.

It should be understood that the appended drawings are not necessarily to scale, presenting a somewhat simplified representation of various preferred features illustrative of the basic principles of the invention. The specific design features of the present invention as disclosed here, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

First, the system for classifying a vehicle occupant will be described with reference to FIGS. 3 to 6.

Figure 3:
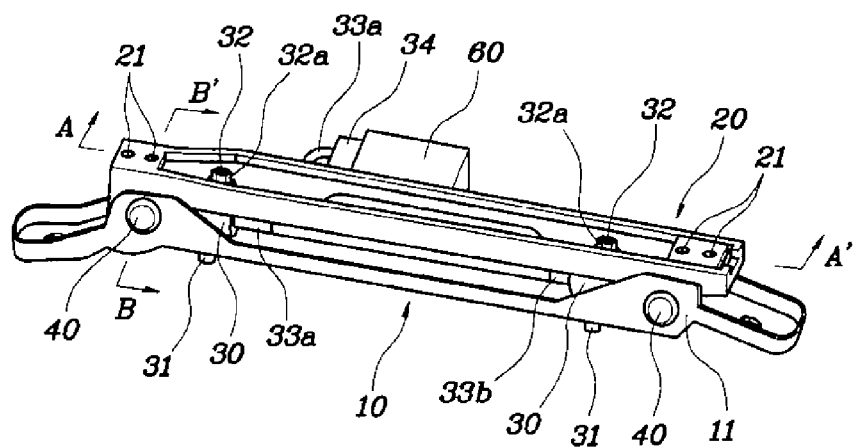
FIG. 3 is a schematic diagram showing a system for classifying a vehicle occupant having two sensors according to an exemplary embodiment of the present invention.

As shown in FIG. 3, the system for classifying a vehicle occupant includes a base 10 installed in each of the leg frames (not shown) of a seat, a cover 20 installed above the base to be spaced apart from the base 10, two weight sensors 30 installed between the base 10 and the cover 20, and a control unit 60 connected to the weight sensors 30 by wires 33a and 33b and a connector 34. The two weight sensors 30 measure the load transmitted to the cover 20 by the weight of a vehicle occupant sitting in a seat. The control unit 60 receives values measured by the weight sensors 30, and determines whether the vehicle occupant sitting in the seat is an adult or a child based on the received values of load. Meanwhile, a moving rail (not shown) is mounted on the cover 20, and fastening holes 21 are formed in the upper surfaces of both ends of the cover 20 in order to tighten the moving rail.

Figure 4:
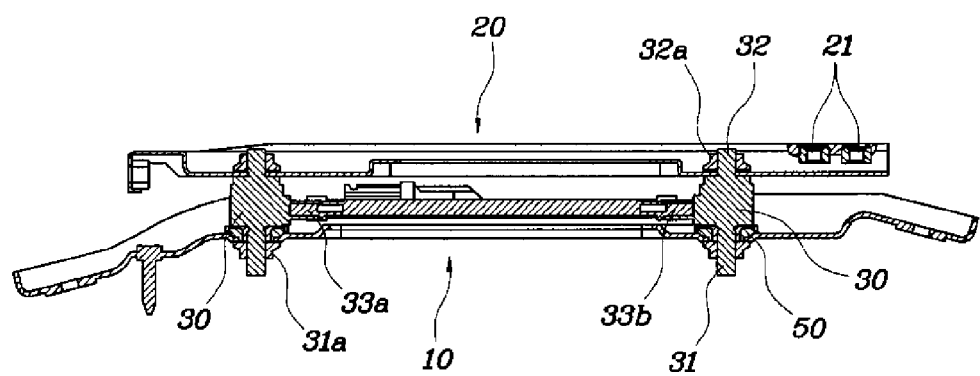
FIG. 4 is a cross-sectional view taken along the line A-A' of FIG. 3.
Figure 5:
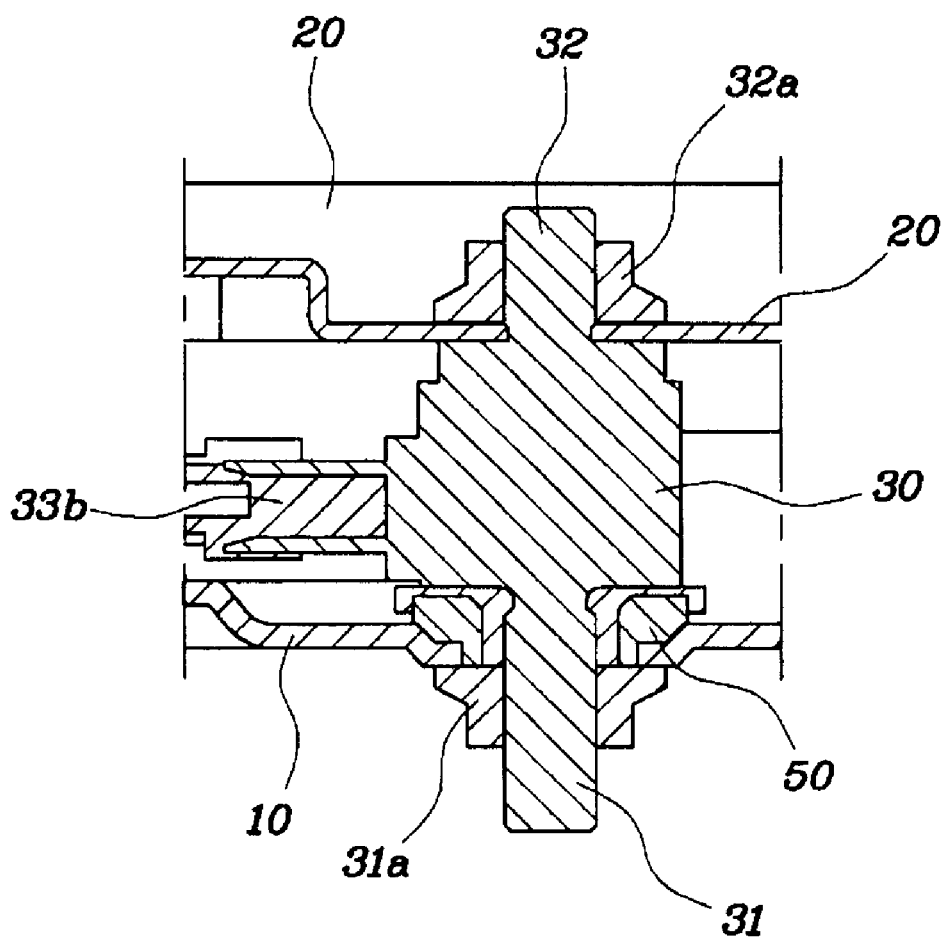
FIG. 5 is an enlarged view of the riot part of FIG. 4.

As shown in FIGS. 4 and 5, the two weight sensors 30 are installed above the base 10 to be spaced apart from the base 10 to support the cover 20. The lower bolt 31 and the upper bolt 32 of the weight sensor 30 respectively penetrate through a portion of the base 10 and a portion of the cover 20, and are fastened and tightened by nuts 31a and 32a. The cover 20 is moved downward in the direction of the weight sensor 30 by the load. A shock absorption member 50 is interposed between the weight sensor 30 and the base 10 in order to protect the weight sensors and compensate for assembly tolerance.

Figure 6:
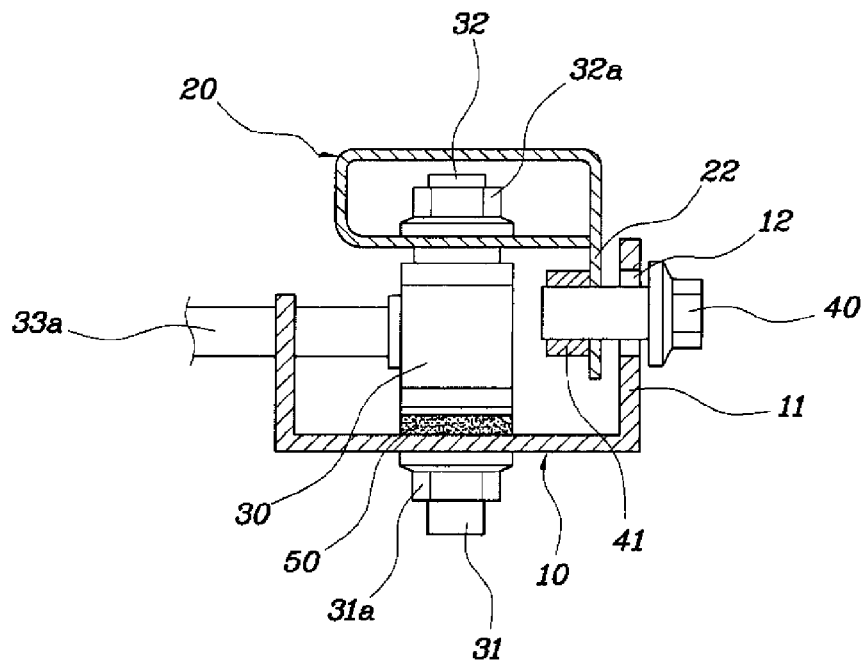
FIG. 6 is a cross-sectional view taken along the line B-B' of FIG. 3.

Referring to FIGS. 3 and 6, a stopper 40 is interposed between the base 10 and the cover 20 in order to limit the downward movement range of the cover 20 in the case of overload. That is, the stopper 40 is bolted on a skirt section 22 of the cover 20, and is fastened and tightened by nuts 41. The front end of the stopper 40 penetrates through the buffer hole 12 of a base expansion section 11 of the base 10 and is exposed to the outside. The diameter of the buffer hole 12 is larger than that of the stopper 40. Further, in the state in which no load is applied to the cover 20, the stopper 40 is arranged at the center of the buffer hole 12.

Figure 7:
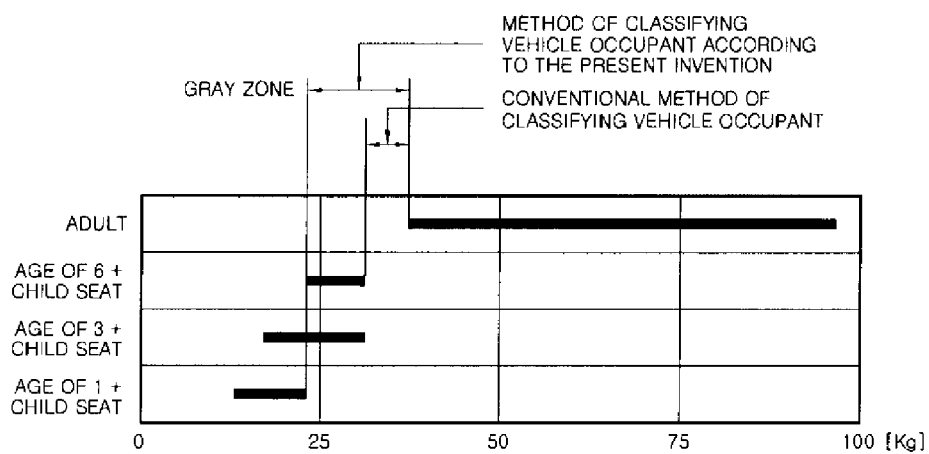
FIG. 7 is a view showing the advantages of criteria for airbag deployment according to the exemplary embodiment of the present invention.

Meanwhile, according to an exemplary embodiment of the present invention, the target for which an airbag is not to be deployed is changed from a small child 6 years old or younger to an infant 1 year old or younger. In this case, since an airbag must be deployed even for small children 3 or 6 years old, there is a burden in that the extent of injury to children caused by the deployment of an airbag is required to be decreased. However, recently, an airbag softer than a conventional airbag has been developed, so that the criteria for selecting the target for which an airbag is not to be deployed have changed for the better. Further, since the target for which an airbag is not to be deployed is set to an infant 1 year old or younger, the system can more reliably avoid the problem in which an adult is erroneously determined to be a small child due to the change in the posture of an occupant. The usefulness of this criteria change is easily understood by referring to FIG. 7. That is, since the gap between small children and adults is much greater than that of the prior art, the likelihood of erroneous occupant classification of the system can be decreased.

Figure 8:
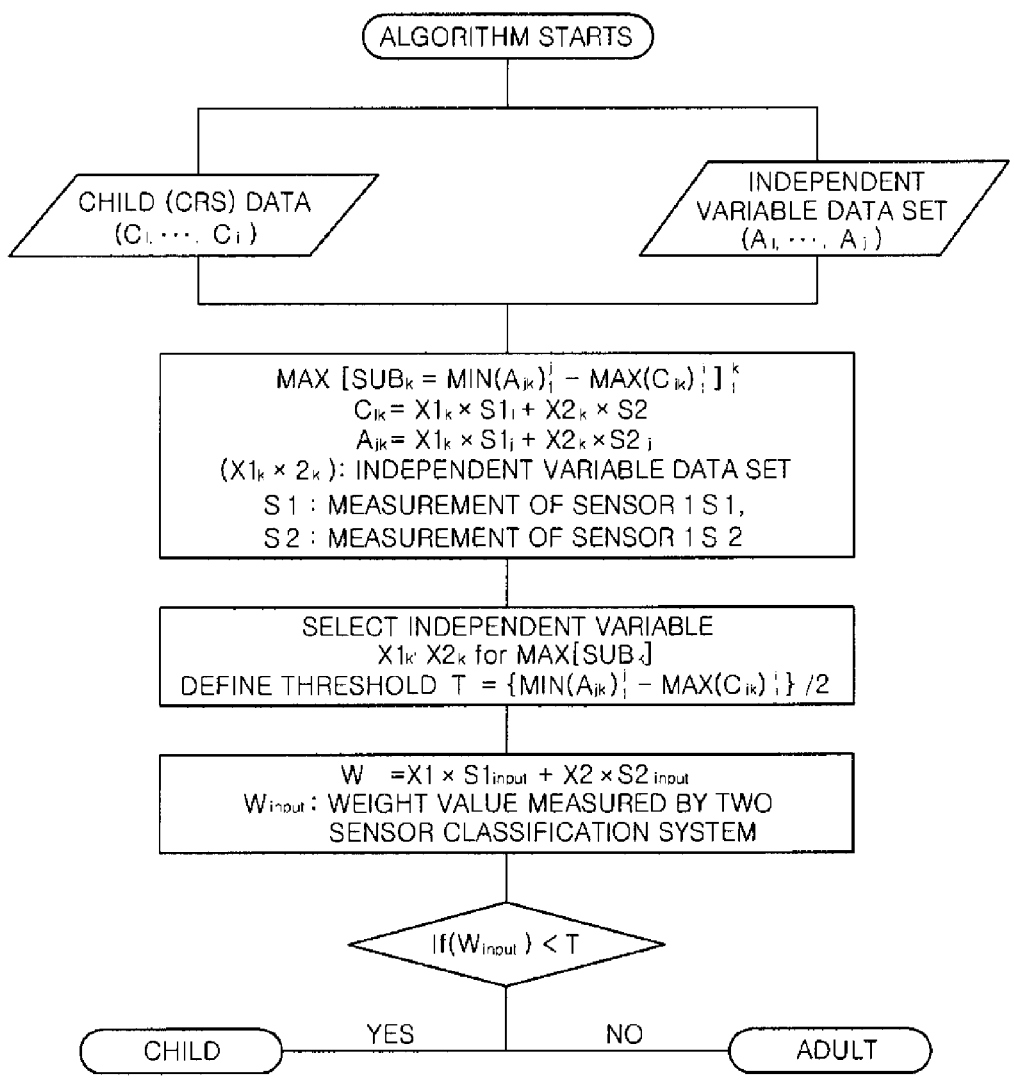
FIG. 8 is a flowchart showing a method of classifying a vehicle occupant according to an exemplary embodiment of the present invention.

Next a method of classifying a vehicle occupant using the system for classifying a vehicle occupant having two sensors (hereinafter referred to as "two sensor classification system") will be described with reference to FIG. 8.

In the case of the system for classifying a vehicle occupant having four sensors, the weight of a vehicle occupant is obtained by simply summing up values measured by the respective sensors. However, the weight of a vehicle occupant in the case of the two-sensor classification system is not obtained using such a method. Moreover, since the weight of a vehicle occupant sitting in a seat is not uniformly distributed throughout the seat, the determination of "weight of a vehicle occupant=sum of values measured by two sensors×2" considerably inaccurate.

Therefore, speaking relatively simply, in order to identify a vehicle occupant using the two sensor classification system, it is necessary to derive optimal variables X1 and X2 which can satisfy the relationship of "weight of a vehicle occupant=X1× S1+X2×S2", where S1 and S2 are load values measured by the respective weight sensors (hereinafter referred to as "sensor measurement load value set") and X1 and X2 are optimal independent variables (hereinafter referred to as "optimal independent variable set). The optimal independent variable set (X1, X2) is obtained based on actual experiments. When the optimal independent variable set (X1, X2) is obtained, a threshold value, used to identify a vehicle occupant can be obtained based on the optimal independent variable set (X1, X2) as explained hereinafter.

Obtainment of Sensor Measurement Load Value Set as Weight Data

A performance test for a system for classifying a vehicle occupant is performed by, for example, seating thirty types of adult dummies and sixteen types of child dummies wearing CRS (hereinafter simply referred to as "child dummy") in seats, and verifying whether the system for classifying a vehicle occupant can accurately classify them.

In order to select an optimal independent variable set (X1, X2), it is assumed that the number of child dummy types is "i" and the number of adult dummy types is "j". Therefore, the 1 sensor measurement load value set $(S1_i, S2_i)$ for child dummies and j sensor measurement load value sets ($S1_j$, $S2_j$) for adult dummies can be obtained using the two sensor classification system.

Selection of Optimal Independent Variable Set

An optimal independent variable set (X1, X2) for classification as adults or children is derived based on the obtained sensor measurement load value set ($S1_i$, $S2_i$) and ($S1_j$, $S2_j$) of the child and adult dummies.

The optimal independent variable set (X1, X2) is calculated based on the following Equation 1.

$$\text{MAX}[SUB_k = \text{MIN}(A_{jk})_1^j - \text{MAX}(C_{ik})_1^i]_l^k \text{ Where } C_{ik} = \quad \text{(Equation 1)}$$
$$X1_{ik} \times S1_i + X2_{ik} \times S2_i \text{ and } A_{jk} =$$
$$X1_{jk} \times S1_j + X2_{jk} \times S2_j.$$

For this calculation, at first, independent variable sets for adult or child dummies are preset. That is, an independent variable set ($X1_{ik}$, $X2_{ik}$) is preset for child dummies. The independent variable set ($X1_{jk}$, $X2_{jk}$) is preset for adult dummies.

The respective sensor measurement load value sets ($S1_i$, $S2_i$) and ($S1_j$, $S2_j$) for child and adult dummies are multiplied by respective preset independent variable sets ($X1_{ik}$, $X1_{ik}$) and ($X1_{jk}$, $X2_{jk}$) by matrix computation. That is, $X1_k$ of each independent variable set is a variable to be multiplied by S1, and $X2_k$ is a variable to be multiplied by S2, so that the respective weight value set $A_{jk}$ and $C_{jk}$ of the adult and child dummies are obtained.

Thereafter, the minimum weight value of the adult dummies and the maximum weight value of the child dummies for the respective independent variable sets are extracted, and a independent variable set, which maximizes the difference between the minimum weight value of the adult dummies and the maximum weight value of the child dummies, is selected as the optimal independent variable set (X1, X2).

Variables for child and adult dummies are arranged in rows $X1_1$ to $X1_k$ and columns $X2_1$ to $X2_k$, in a predetermined range, and are processed as matrix combination type data in which the value between each of the rows and each of the columns has a difference by a predetermined value (for example, 0.1). Of course, according to setting, the variable data $X1_k$ and $X2_k$ may have an upper limit and a lower limit (for example, a rational number between 0 to 2) and correlation may be applied between respective elements (for example, $X1_k + X2_k = 2$).

Selection of Threshold Value

A threshold value T is selected as a value which is optimized to discriminate between adults and children and ranges between the minimum weight value of the adult dummies and the maximum weight value of the child dummies. Preferably, the threshold value T is the average value of the minimum weight value of the adult dummies and the maximum weight value of the child dummies, which satisfies $\text{MAX}[SUB_k]$.

Method of Classifying Vehicle Occupant

The optimal independent variable set (X1, X2) and the threshold value T, which are obtained in the above process, are unit values of the corresponding two sensor classification system, and the two sensor classification system can identify a vehicle occupant sitting in a seat using the optimal independent variable set (X1, X2) and the threshold value T.

First, when a vehicle occupant is sitting on a seat in which the two sensor classification system is installed, the control unit multiplies sensor measurement load value sets ($S1_{input}$, $S2_{input}$) by the optimal independent variable set (X1, X2) and calculates the sum thereof, as illustrated in Equation 2. The sum indicates the weight value of the vehicle occupant measured by the two sensor classification system.

$$W_{input} = X1 \times S1_{input} + X2 \times S2_{input} \quad \text{(Equation 2)}$$

Next, the two sensor classification system compares the measured weight value ($W_{input}$) of a vehicle occupant with the threshold value T, and determines that the vehicle occupant is a child when $W_{input}$ is smaller than T. Otherwise, the two sensor classification system determines that the vehicle occupant is an adult. The results of the comparison are transmitted to the airbag control unit.

Figure 9:
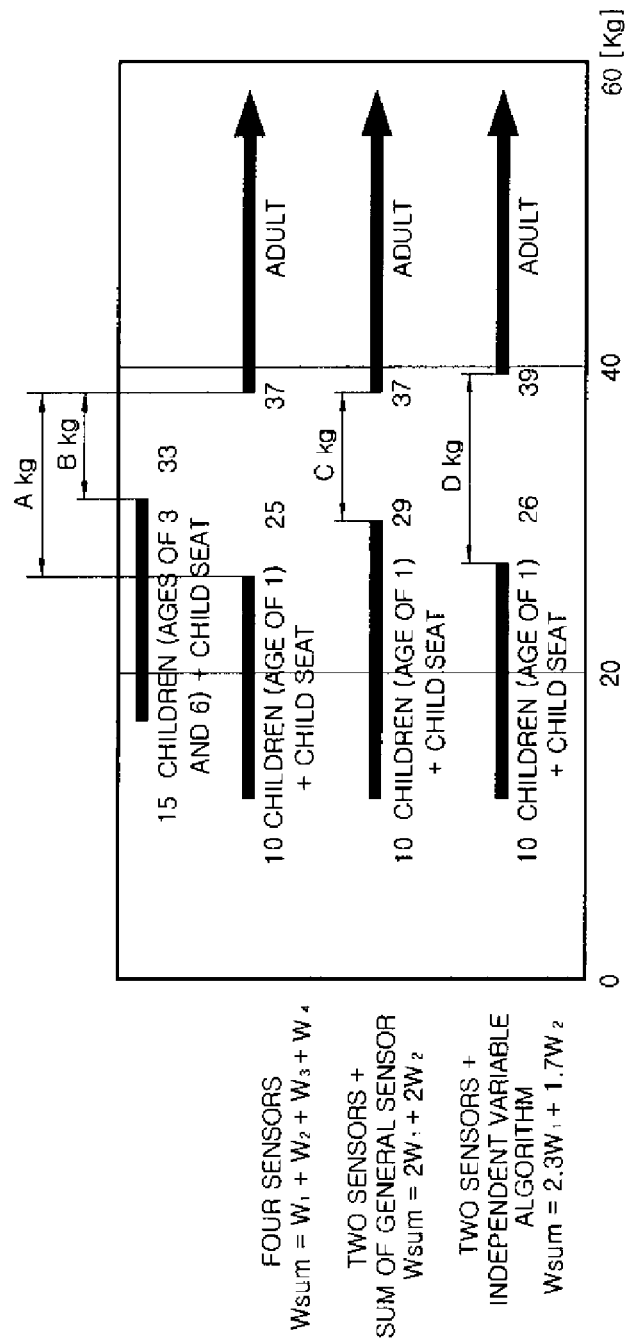
FIG. 9 is a flowchart showing the advantages of the method of classifying a vehicle occupant according to the exemplary embodiment of the present invention.

Meanwhile, a graph which compares the method of classifying a vehicle occupant according to the above-described exemplary embodiment with another method of classifying a vehicle occupant will be illustrated. As shown in FIG. 9, in the case of the four sensor classification system, when a target for which an airbag is not to be deployed is changed from small children between 3 or 6 years old to infants 1 year old or younger, the gap between adults and small children, which is required for discrimination therebetween, is increased from B kg to A kg. However, when the independent variable algorithm according to the exemplary embodiment of the present invention, the gap is D kg, which is much greater than A kg. In the case of the two sensor classification system, which does not use the independent variable algorithm and simply doubles the values of weights measured by two sensors, the gap is C kg, that is, the fact that the gap is smaller than that of the case in which four sensors are used has been experimentally demonstrated.

According to the system and method for classifying a vehicle occupant configured as described above, although the number of weight sensors is decreased to two, a vehicle occupant sitting in a seat can be accurately identified.

Further, the system for classifying a vehicle occupant is modulized, so that the assembly and durability for seats are excellent.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for classifying a vehicle occupant comprising: a base installed in each of leg frames of a seat of a vehicle; a cover installed above the base to be spaced apart from the base with a predetermined distance; a first weight sensor and a second weight sensor installed between the base and the cover to support the cover, and configured to measure a load transmitted to the cover by a weight of a vehicle occupant sitting in the seat; and a control unit configured to receive load values measured by the first and second weight sensors, and determine whether the vehicle occupant sitting in the seat is an adult or a child based on the received load values; wherein the control unit calculates the weight of the vehicle occupant by multiplying a two-sensor measurement load value set with an optimal independent variable set (X1.sub.k, X2.sub.k) where the optimal independent variable set (X1.sub.k, X2.sub.k) is a variable set that for various types of adult and child dummies, belongs to variable set within a range of a predetermined rational value, by which the two-sensor measurement load value set is multiplied, and maximizes a difference between a minimum weight value of the adult dummies and a maximum weight value of the child dummies.

2. The system for classifying the vehicle occupant as set forth in claim 1, wherein the first weight sensor and the second weight sensor is spaced with a predetermined distance in a longitudinal direction of the cover or the base.

3. The system for classifying the vehicle occupant as set fort in claim 1, wherein a first shock absorption member is interposed between the first weight sensor and the base and a second shock absorption member is interposed between the second weight sensor and the base.

4. The system for classifying the vehicle occupant as set forth in claim 1, wherein at least a stopper is interposed between the base and the cover in order to limit a downward movement range of the cover in a case of overload.

5. The system for classifying the vehicle occupant as set fort in claim 4, wherein a proximate end portion of the stopper is coupled to a lower portion of the cover and the a distal end portion of the stopper is penetrated into a buffer hole of the base, wherein the buffer hole is larger than the diameter of the stopper.

6. The system for classifying the vehicle occupant as set forth in claim 1, wherein the range of the predetermined rational value is from "0" to "2."

7. The system for classifying the vehicle occupant as set forth in claim 1, wherein the control unit compares the calculated weight value of the vehicle occupant with a threshold value, and classifies the vehicle occupant, where the threshold value is set to an average value of the minimum weight value of adult dummies and the maximum weight value of child dummies.

8. A method of classifying a vehicle occupant sitting in a seat using a system for classifying a vehicle occupant using two weight sensors, the method comprising: determining a weight of a vehicle occupant by multiplying two-sensor measurement load value set with an optimal independent variable set ($X1.sub.k$, $X2.sub.k$) and calculating the sum thereof; comparing the calculated weight value of the vehicle occupant with a preset threshold value; and determining whether the vehicle occupant is an adult or a child; wherein the step of determining the optimal independent variable set ($X1.sub.k$, $X2.sub.k$) comprises: obtaining a first sensor measurement load value set for various weight types of child dummies and a second sensor measurement load value set for various weight types of adult dummies; presetting a first independent variable set having a range of a predetermined rational value for child dummies and a second independent variable set having a range of a predetermined rational value for adult dummies; obtaining the child weight data multiplying the first sensor measurement load value set and the first independent variable set of the child dummies, and obtaining the adult weight data multiplying the second sensor measurement load value set and the second independent variable set of the adult dummies; and determining the optimal independent variable set ($X1.sub.k$, $X2.sub.k$) from the preset independent variable sets of child and adult dummies, which maximize a difference between a minimum adult weight value of the adult weight data and a maximum child weight value of the child weight data.

9. The method as set forth in claim 8, wherein the preset threshold value is set to an average value of the minimum adult weight value of adult dummies and the maximum child weight value of child dummies.

10. The method as set forth in claim 8, wherein each element $X1.sub.k$ and $X2.sub.k$ of the optimal independent variable set ($X1.sub.k$, $X2.sub.k$) has a range of a predetermined rational value.

11. The method as set forth in claim 10, wherein elements of the optimal independent variable set ($X1.sub.k$, $X2.sub.k$) have a relationship of $X1.sub.k + X2.sub.k = $ a predetermined rational value.

12. The method as set forth in claim 8, wherein the predetermined rational value is from "0" to "2".

* * * * *